United States Patent [19]

Anderson

[11] Patent Number: 5,046,579
[45] Date of Patent: Sep. 10, 1991

[54] WHEEL MOUNTING APPARATUS

[76] Inventor: Jack W. Anderson, 2200 Stoney Point Rd., East Berlin, Pa. 17316

[21] Appl. No.: 566,662

[22] Filed: Aug. 13, 1990

[51] Int. Cl.$^5$ .......................................... B60K 17/354
[52] U.S. Cl. .................................... 180/340; 180/344; 180/253; 301/9 TV
[58] Field of Search ................. 180/209, 16, 340, 344, 180/347, 350, 357, 360, 371, 373, 385, 900, 905, 906, 253, 21; 280/43, 30; 403/1, 3; 301/128, 9 TV; 56/2, 208, 209, 214

[56] References Cited

U.S. PATENT DOCUMENTS

| | | | |
|---|---|---|---|
| 2,079,290 | 5/1937 | Jencick | 180/357 |
| 2,091,509 | 8/1937 | Kramer | 180/357 |
| 2,811,368 | 10/1957 | Clausen | 280/43 |
| 2,878,731 | 3/1959 | Kressin | 404/85 |
| 3,146,843 | 9/1964 | Hinson et al. | 180/373 |
| 4,418,783 | 12/1983 | Teraoka et al. | 180/209 |
| 4,602,800 | 7/1986 | Persson | 280/6.12 |
| 4,619,340 | 10/1986 | Elmer et al. | 180/209 |

Primary Examiner—Charles A. Marmor
Assistant Examiner—Tamara L. Finlay
Attorney, Agent, or Firm—Webb, Burden, Ziesenheim & Webb

[57] ABSTRACT

A wheel mounting apparatus includes a frame attached to an axle suspension of a vehicle. A riser extends downward from the frame. A universal joint attaches to an existing wheel hub of the vehicle. An axle extension extends from the universal joint. The axle extension is journaled in the frame. Journaled in the riser is a short axle. A drive means transfers torque between the axle extension and the short axle. A second wheel hub attaches to the short axle. A truck tire attaches to the second wheel hub. The wheel mounting apparatus, which must be used in sets of four, can be attached without any modification to the vehicle.

4 Claims, 2 Drawing Sheets

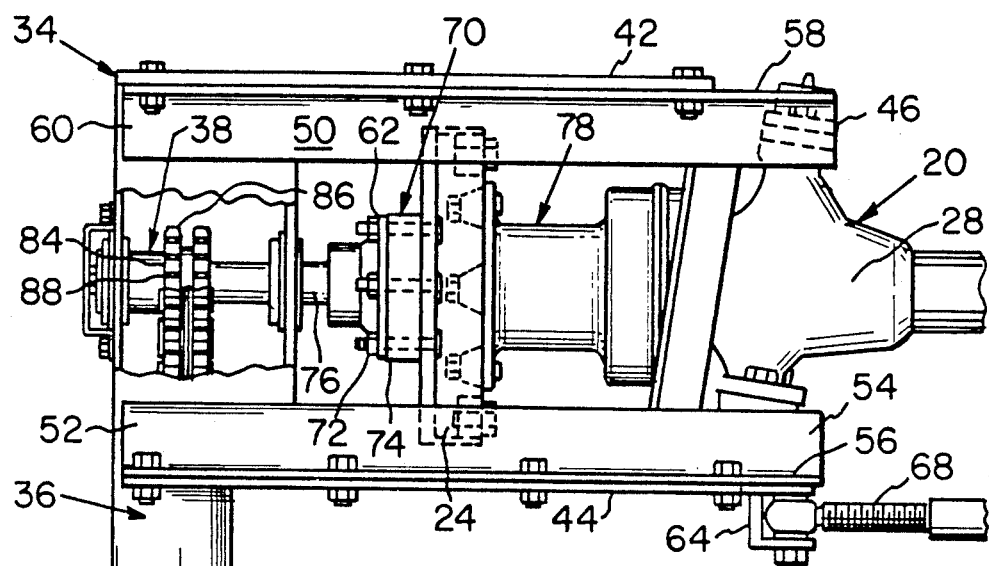
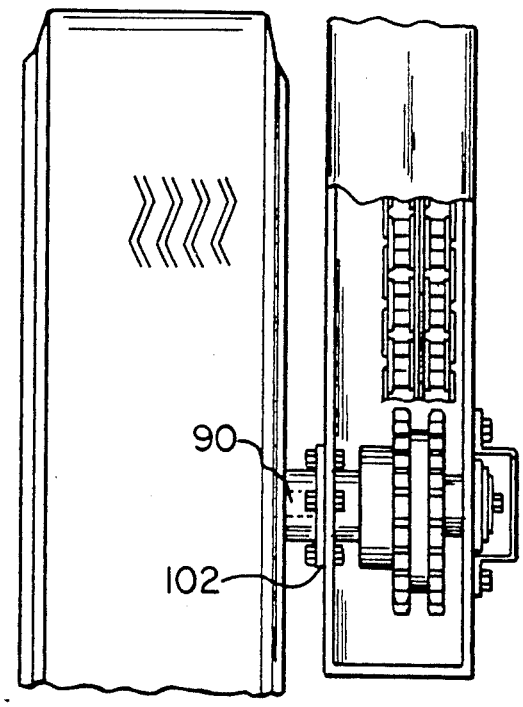
Fig. 3
Fig. 4

WHEEL MOUNTING APPARATUS

FIELD OF THE INVENTION

This invention relates to a wheel mounting apparatus and, more particularly, to wheel mounting apparatus which, when attached to a vehicle, elevate and maintain said vehicle at a fixed height, while allowing for lateral adjustment of the wheels.

DESCRIPTION OF THE PRIOR ART

Wheeled vehicles whose body, height above the ground and distance between the wheels can be adjusted are known in the art, particularly for use in agriculture. These vehicles can often be raised or lowered relative to the ground to a variety of different levels. This manipulation is accomplished in various ways such as by use of telescoping cylinders, wheels of different diameters, or arrangements which allow for attachment of the wheels at various positions of the vehicle body. The lateral positioning of the wheels can be adjusted in similar manners. However, these manipulations can be very difficult to make because the structure becomes complicated and elaborate. Often, the appropriate body height above the ground and width between the tires cannot be achieved, and the larger of these vehicles lack durability.

It is, therefore, an object of this invention to provide a less complicated yet durable way to elevate and maintain a truck at a certain height while allowing for the distance between the wheels to be altered. This object is achieved by the addition of wheel mounting apparatus to an existing vehicle, which can be mounted without any modification of said vehicle. The wheel mounting apparatus are fixed to the vehicle in such a way that translation and rotation are minimized while allowing maneuverability of the vehicle in the fields.

SUMMARY OF THE INVENTION

Disclosed is an apparatus which elevates and maintains a vehicle at a given height while allowing for the lateral adjustment of the distance between the wheels of the vehicle. This invention has particular application in agriculture. The truck can be used in the fields since it will have sufficient height clearance and the wheels of the truck can be adjusted so as to straddle the plants and pass between the plant rows.

A single wheel mounting apparatus in accordance with the present invention includes a support frame attached to an axle suspension of a truck. Four mounting apparatus are required to elevate a four-wheel drive vehicle. The axle suspension supports an axle and a wheel hub for rotation. A riser extends downward from the support frame. A universal joint, from which extends an axle extension, transfers rotational motion from the wheel hub through the axle extension to a first drive sprocket. A short axle is journaled in the riser. A second drive sprocket is attached to the short axle inside the riser, and a second wheel hub is attached to the short axle outside of the riser. A truck tire is attached to the second wheel hub. A linked chain engaged by both the first and second drive sprockets transfers rotational motion from the first drive sprocket to the second drive sprocket, thus rotating the second wheel hub and the truck tire.

DESCRIPTION OF THE DRAWINGS

Further features and other objects and advantages will become clear from the following detailed description made with reference to the drawings in which:

FIG. 3 is a front view in partial section of the wheel mounting apparatus attached to a typical front axle; and FIG. 4 is a view similar to FIG. 3, showing the alternate position of the second wheel hub and the truck tire on the wheel mounting apparatus.

DESCRIPTION OF THE PREFERRED EMBODIMENT

Figure 1:
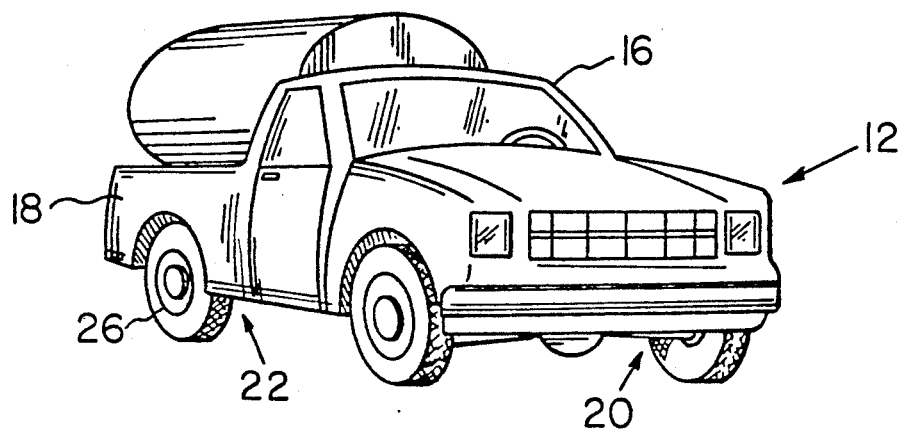
FIG. 1 is a perspective view of a truck prior to having the wheel mounting apparatus attached thereto.
Figure 2:
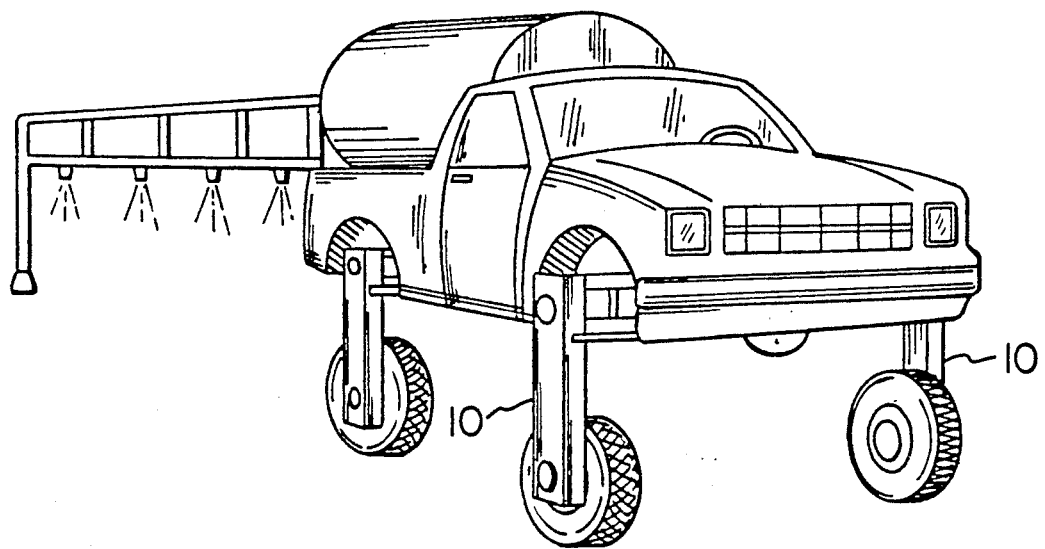
FIG. 2 is a perspective view of a truck having four of the wheel mounting apparatus attached thereto.

Referring to FIGS. 1 and 2, an apparatus 10 is provided for raising a vehicle, and maintaining the vehicle at a specific height. This apparatus 10 has particular application in agriculture, as both the height of the vehicle and the distance between the wheels can be adjusted to avoid destruction of crops when the vehicle is used to spray fertilizer and the like. The apparatus 10 can be applied to any wheeled vehicle, but are preferably attached to a truck 12 such as the one shown in FIG. 1. The truck 12 includes a cab 16 positioned forwardly and a flat bed 18 extending laterally from the cab 16, onto which crop spraying or other agricultural equipment can be placed. The truck 12 has a front axle suspension 20 and a back axle suspension 22, each having corresponding first and second ends. On each end of the front axle suspension 20 and back axle suspension 22 is a wheel hub 24, to which a truck tire 26 can be attached. On each end of the front axle suspension 20 exists a knuckle joint 28 which allows for turning the truck tires 26.

Wheel mounting apparatus 10 in accordance with the present invention are shown in FIGS. 2, 3, and 4. FIG. 2 shows four of the wheel mounting apparatus 10 attached to the truck 12, as the invention must be used in sets of four.

Referring to FIGS. 3 and 4, the present invention includes generally a hollow support frame 34 from which downwardly extends a hollow riser 36. Situated therein is a first drive sprocket 38 which transfers rotational motion from the existing wheel hub 24 of the truck 12 to a second drive sprocket 40, which causes the truck tire 26 to rotate.

The hollow support frame 34 extends laterally from an existing axle suspension 20, 22 of a truck 12, and is detachably mounted thereto. The support frame 34 has a rectangular upper plate 42 spaced apart from and parallel to a rectangular lower plate 44. Each plate has an inner and outer surface and inner and outer ends.

Upper angle brackets 50 and lower angle brackets 52 (L-shaped cross section), with two equal legs 54, 56 and opposite ends, one end 58 being free and one end 60 being fixed, provide the support frame 34 with added strength. The upper brackets 50 attach to the inner surface of the upper plate 42 by threaded bolts 62 which pass through the upper plate 42 and one leg 56 of the upper brackets 50. The upper brackets 50 are aligned with the upper plate 42, but the upper brackets 50 are longer than the upper plate 42, and extend beyond the upper plate 42 for a certain length. An upper crosspiece 46 at the free end 58 of the upper brackets 50 attaches to the front axle suspension 20, directly above the knuckle joint 28.

The lower brackets 52 attach to the inner surface of the lower plate 44 by threaded bolts 62 which pass through the lower plate 44 and one leg 56 of the lower brackets 52. The lower brackets 52 are aligned with the lower plate 44, and they are of approximately equal length. A lower crosspiece (not shown) at the free end 58 of the lower brackets 52 attaches to the front axle suspension 20, directly below the knuckle joint 28. The free ends 58 of the upper brackets 50 and lower brackets 52 correspond.

The apparatus 10 attach on the first and second ends of the front axle suspensions 20 and the first and second ends of the back axle suspensions 22 such that the apparatus 10 on the first end of the front axle suspension 20 and the first end of the back axle suspension 22 are aligned, and are parallel to the apparatus on the second end of the front axle suspension 20 and second end of the back axle suspension 22.

An angle (L-shaped cross section) 64 attaches across the outer surface of the lower plate 44 at the inner end of the support frame 34 which in turn attaches to a tie-rod 68 by a threaded bolt 62 which passes through the angle 64. The support frame 34 attaches to the truck 12 at either two or three points: above the knuckle joint 28 on the front axle suspension 20 or a corresponding position on the back axle suspension 22, below the knuckle joint 28 on the front axle suspension 20 or a corresponding position on the back axle suspension 22, and in the case of a front axle to the tie-rod. These points of attachment serve to minimize translation and rotation, while allowing for steering the apparatus 10.

A hollow riser 36, having upper and lower ends, depends from and is transverse to the support frame 34, and is attached to that end of the support frame 34 which is not attached to the axle suspension.

A universal joint 70, having a center 72 and a perimeter 74, attaches to the existing wheel hub 24 of the truck 12 by a plurality of threaded bolts 62 which pass through the perimeter 74 of the universal joint 70. An axle extension 76 extends laterally from the center 72 of the universal joint 70 and is journaled in the support frame 34. The universal joint 70 transmits uniform rotary motion from the existing axle turning within drive housing 78 to the axle extension 76. In this way, flexing of the support frame will not cause flexing of the axle extension or place a bending moment upon the existing axle.

A first drive sprocket 38 having a center 84 and a perimeter 86 mounts through the center 84 on the axle extension 76. A plurality of teeth 88 project at regular intervals from the perimeter 86. The first drive sprocket 38 is fixed to the axle extension 76 such that when the axle extension 76 rotates, the first drive sprocket 38 also rotates.

Journaled in the lower end of the riser 36 is a short axle 90. This short axle 90, illustrated by phantom lines in FIG. 3, projects outside of the riser 36. A second drive sprocket 40 having a center 92 and a perimeter 94 mounts through the center 92 on the short axle 90 inside the riser. A plurality of teeth 88 project at regular intervals from the perimeter 94. The second drive sprocket 40 is rotatably attached to the short axle 90.

The first drive sprocket 38 has a smaller perimeter 86 and fewer teeth 88 than the secon drive sprocket 40. Specifically, the first drive sprocket 38 is an eleven tooth drive sprocket, and the second drive sprocket 40 is a twenty tooth drive sprocket. Such a combination allows for approximately 55% reduction of existing truck ground speed. This combination can be varied, and the number of teeth 88 in each drive sprocket need not be limited to that as listed above.

A double chain 100 containing a plurality of links is engaged by both the first drive sprocket 38 and second drive sprocket 40 such that rotational motion is transmitted from the first drive sprocket 38 to the second drive sprocket 40.

A second wheel hub 102 attaches to that part of the short axle 90 which extends outside the riser 36. A truck tire 26 then attaches to the second wheel hub 102 by a plurality of threaded bolts 62. The short axle 90 and the second wheel hub 102 can be removed and reversed, so that the truck tire 26 can be placed on either side of the riser 36. This optional positioning of the truck tire 26 allows for variation of the distance between the tires 26.

While the applicant has described a chain drive between the short axle and axle extension, other apparatus may be used to transfer torque therebetween. The transfer mechanism should be positive, i.e., except for unavoidable backlash, it should not allow relative rotation of the axle extension and the short axle that does not transfer power therebetween. In this way, the standard braking system on the vehicle will still serve its intended function. The energy for stopping the vehicle can be dissipated on the existing brake discs or drums. Note that since the transfer mechanism transfers power for forward and reverse locomotion and forward and reverse braking, it must be designed to transfer power either way between the axle extension and short axle when the short axle is rotating in either angular direction. The chain drive described herein has been demonstrated to fulfill this requirement.

Having thus described the invention with the detail and particularity required by the Patent Laws, what is claimed and desired to be protected by Letters Patent is set forth in the following claims.

1. An apparatus for elevating a wheeled vehicle when attached to an axle suspension of the vehicle, said axle suspension supporting an axle and first wheel hub for rotation, said apparatus comprising:

a support frame with a top, bottom and opposite ends, said frame enclosing said first wheel hub and being attached at the top and bottom near one end to the axle suspension such that translation and rotation of the frame relative to the axle suspension are minimized;

a hollow riser, having an upper and lower end, said riser fixed to and extending downward from the end of the support frame not attached to the axle suspension;

a universal joint attached to said first wheel hub of the vehicle;

an axle extension extending from the universal joint and journaled in the support frame;

a short axle journaled in the lower end of the riser;

a second wheel hub attached to the short axle outside the riser;

a means of attaching a tire to the second wheel hub; and means between the axle extension and the short axle for transferring torque therebetween.

2. The apparatus of claim 1 in which the second wheel hub can be attached on either side of the riser.

3. The apparatus according to claim 2 wherein the short axle and the second wheel hub attached thereto can be removed from the riser and reinstalled with the second wheel hub on the opposite side of the riser.

4. The apparatus according to claim 1 wherein the torque transferring means further comprises a first toothed drive sprocket attached to the axle extension;

a second toothed drive sprocket attached to the short axle; and a drive means attached to the first and second drive sprockets such that rotational motion is transmitted from the first drive sprocket to the second drive sprocket.

* * * * *